(12) United States Patent
Dunkel

(10) Patent No.: US 8,105,007 B2
(45) Date of Patent: Jan. 31, 2012

(54) VEHICLE TRANSPORT RAMP SYSTEM

(76) Inventor: Peter L. Dunkel, Newport Beach, CA (US)

( * ) Notice: Subject to any disclaimer, the term of this patent is extended or adjusted under 35 U.S.C. 154(b) by 926 days.

(21) Appl. No.: 12/123,255

(22) Filed: May 19, 2008

(65) Prior Publication Data

US 2008/0292439 A1   Nov. 27, 2008

Related U.S. Application Data

(60) Provisional application No. 60/939,186, filed on May 21, 2007.

(51) Int. Cl.
*B60P 1/00* (2006.01)

(52) U.S. Cl. .......... 414/545; 414/537; 296/156

(58) Field of Classification Search .......... 296/156; 410/24; 414/545, 546, 554, 557
See application file for complete search history.

(56) References Cited

U.S. PATENT DOCUMENTS

| | | | |
|---|---|---|---|
| 3,961,716 A * | 6/1976 | Renaud | 414/537 |
| 4,020,957 A | 5/1977 | Wren | |
| 4,037,564 A | 7/1977 | Schrock | |
| 4,153,289 A * | 5/1979 | Lewis et al. | 296/24.31 |
| 4,212,578 A * | 7/1980 | Butler | 414/789.3 |
| 4,223,939 A * | 9/1980 | Beggs | 296/26.11 |
| 4,268,209 A * | 5/1981 | Westerman | 414/462 |
| 4,341,371 A | 7/1982 | Rotella | |
| 4,601,632 A | 7/1986 | Agee | |
| 4,789,281 A | 12/1988 | Westerdale | |
| 4,840,534 A | 6/1989 | Totty | |
| 4,907,936 A * | 3/1990 | Bourdage | 414/545 |
| 5,542,810 A | 8/1996 | Florus | |
| 5,630,693 A * | 5/1997 | Sobina | 414/495 |
| 5,676,515 A | 10/1997 | Haustein | |
| 5,697,754 A | 12/1997 | Raymer | |
| 5,769,593 A | 6/1998 | Buffaloe | |
| 5,907,276 A | 5/1999 | Lance | |
| 6,099,232 A | 8/2000 | Dixon et al. | |
| 6,382,898 B2 | 5/2002 | Mason | |
| 6,447,040 B1 | 9/2002 | Young, Sr. | |
| 6,722,721 B2 | 4/2004 | Sherrer et al. | |
| 7,140,820 B2 | 11/2006 | Chang | |
| 7,147,268 B2 * | 12/2006 | Winter | 296/156 |
| 7,165,486 B2 | 1/2007 | Alexander et al. | |
| 7,179,042 B1 | 2/2007 | Hartmann et al. | |
| 7,188,843 B2 | 3/2007 | Magness | |
| 7,192,240 B2 | 3/2007 | Aulicino | |

* cited by examiner

*Primary Examiner* — Charles A Fox
(74) *Attorney, Agent, or Firm* — Stetina Brunda Garred & Brucker

(57) ABSTRACT

A vehicle transport ramp system having a transport vehicle with a transport vehicle bed, a first side wall and an opposing second side wall; an upper ramp having a first upper ramp end and a second upper ramp end operative to form a door, and a first upper ramp edge and an opposing second upper ramp edge; a lower ramp having a first lower ramp side and a second lower ramp side, a first lower ramp edge and a second lower ramp edge, a first lower ramp end pivotally connected to the second upper ramp end, and a second lower ramp end pivotally mountable to the transport vehicle bed; a first lower ramp enclosure panel and a second side wall enclosure panel mountable to the first lower ramp side, and a first side wall enclosure panel and a second side wall enclosure panel to enclose the transport vehicle as the lower ramp is lowered toward the driving surface.

18 Claims, 5 Drawing Sheets

VEHICLE TRANSPORT RAMP SYSTEM

CROSS-REFERENCE TO RELATED APPLICATIONS

This application claims the benefits of U.S. Provisional Patent Application Ser. No. 60/939,186 entitled "Vehicle Loading Ramp" filed May 21, 2007, the entire contents of which are expressly incorporated herein by reference.

STATEMENT RE: FEDERALLY SPONSORED RESEARCH/DEVELOPMENT

Not Applicable

BACKGROUND

The present invention relates generally to a vehicle transport ramp system for use on most transport vehicles for loading and unloading transported vehicles.

The transport by a larger ground-based transport vehicle of another transported vehicle has traditionally been necessitated by a vehicle's mechanical failure or disablement following an accident. The transport vehicle may also be used to move a specialty vehicle for display at a car show, a motor sport vehicle, or a companion vehicle for use at a vacation destination, such as a remote camp site or cross-country tour. The transported vehicle is commonly pulled by the transport vehicle by the use of a towing harness, as is commonly equipped on a tow truck offering emergency road-side assistance. Alternatively, a vehicle may be loaded and unloaded on to a transport vehicle bed on the transport vehicle. Such transporting vehicles are intended for use on paved highway and street surfaces.

Under some circumstances, the transported vehicle may be used in an "off-road" environment, for example a dune buggy intended to be driven on sand dunes. The transport vehicle itself may also elect to be driven "off-road" en route to its final destination. Such transport vehicles may have 4×4 wheel suspensions and drive systems that allow them to operate on uneven and unpaved driving surfaces.

There are a number of vehicle ramp systems for transport vehicles intended to be used on paved highway or road surfaces. These systems do not appear to be intended for use on transport vehicles having an elevated 4×4 wheel suspension and drive system with an increased ground clearance between the wheel base and the driving surface. The use of these prior art ramp systems with transport vehicles having an increased ground clearance may result in the "hang up" of the transported vehicle during the loading and unloading process. This occurs when the pitch or slope of the ramp system is increased to account for the greater distance between the wheel base and the driving surface, rather than by lengthening the ramp itself. As a result, the undercarriage of the transported vehicle may "hang up" or abut the towards the top of the ramp. In some instances, the transported vehicle may even scrape the ramp and get stuck on the ramp, thereby resulting in potential property damage to the transported vehicle and delay of the loading and unloading process. For instance, U.S. Pat. No. 5,697,754 is understood to disclose "Z-holdable ramp sections" pivotally connectable to a railroad car. A hydraulic actuator Z ramp system appears to utilize hydraulic actuators found within the ramp sections themselves. It is understood that deployment of this ramp section may be completed in less than twenty minutes. This ramp system does not appear to utilize a separately identifiable upper ramp and lower ramp. Nor does the system appear to have either a first lower ramp enclosure panel, a second lower ramp enclosure panel, a first side wall enclosure panel, or a second side wall enclosure panel to enclose the ramp system. It is further understood that this ramp system is not intended for use on transport vehicles having an increased ground clearance equipped for "off-road" driving. It is understood that U.S. Pat. No. 4,601,632 discloses a stowable ramp assembly for pick-up trucks. An extension sleeve and an elongated ramp are telescopically slideable into the ramp. It is understood that the stowable ramp does not form a transport vehicle door on the pick-up truck. Furthermore, this system does not appear to include the use of an upper ramp, a lower ramp, a first lower ramp enclosure panel, a second lower ramp enclosure panel, a first side wall enclosure panel, or a second side wall enclosure panel to enclose the transport vehicle when the lower ramp is lowered toward the driving surface. It is further understood that this ramp system is not intended for use on transport vehicles having an increased ground clearance equipped for "off-road" driving. It is understood that U.S. Pat. No. 5,769,593 discloses a ramp assembly that is pivotally secured to one or more hinge bars along the preexisting rear door of vans, flatbeds, and pick-up trucks. This system does not appear to disclose the use of an upper ramp operative to form a transport vehicle door, as the ramp assembly appears to be connected to the preexisting door. This ramp assembly does not appear to be used with transport vehicles with a higher ground clearance intended for an "off-road" driving mode. Nor does this assembly appear to have a first lower ramp enclosure panel, a second lower ramp enclosure panel, a first side wall enclosure panel, or a second side wall enclosure panel to enclose the transport vehicle. It is understood that U.S. Pat. No. 6,099,232 discloses a loading and unloading device for use on a pickup truck having a ramp that is slideably and pivotally attached to two stationary rails mounted on the bed of the truck and a vehicle carriage mounted to the ramp. A small vehicle can be placed on the carriage for loading and unloading into the pickup truck. This system does not appear to include an upper ramp, a lower ramp, a first lower ramp enclosure panel, a second lower ramp enclosure panel, a first side wall enclosure panel, or a second side wall enclosure panel. Nor does this system appear to provide a combined ramp length required to load a vehicle into a transport vehicle having a higher ground clearance. It is understood that U.S. Pat. No. 7,147,268 discloses a motorized recreational vehicle including a storage or garage area having a ramp for loading and unloading vehicles from street level. This system also discloses the use of a rear gate that folds down to become a ramp. This system does not appear to utilize both an upper ramp and a lower ramp. Nor does it appear to have a first lower ramp enclosure panel, a second lower ramp enclosure panel, a first side wall enclosure panel, or a second side wall enclosure panel. Furthermore, this ramp system does not appear to be intended for transport vehicles having a higher ground clearance in an elevated "off-road" driving mode. It is understood that U.S. Pat. No. 7,140,820 discloses a truck transport vehicle having front and rear sections with a retractable slope, and an elevation deck for the transport of vehicles having an increased load. This system does not appear to have a combined upper ramp and lower ramp for use on transport vehicles with increased ground clearance. Nor does it have a first lower ramp enclosure panel, a second lower ramp enclosure panel, a first side wall enclosure panel, or a second side wall enclosure panel. This transport vehicle system appears to be limited to being pulled by a truck, and no other transport vehicles.

Accordingly, there appears to be a need in the art for a new vehicle ramp system for use by transport vehicles equipped to be driven on all driving surfaces.

SUMMARY OF THE INVENTION

According to an aspect of the present invention, there is provided a vehicle transport ramp system for use with a transport vehicle to be driven on a driving surface, the transport vehicle having a transport vehicle bed, a first side wall and an opposing second side wall about a periphery of the transport vehicle bed. The vehicle transport ramp system includes an upper ramp having a first upper ramp end and an opposing second upper ramp end. The second upper ramp end may generally define an upper ramp plane. The upper ramp may also have a first upper ramp edge and an opposing second upper ramp edge. The upper ramp may be sized and configured to be pivotally mountable to the transport vehicle and operative to form a door. The vehicle transport ramp system may also include a lower ramp having a first lower ramp side and an opposing second lower ramp side. The lower ramp may further have a first lower ramp edge and an opposing second lower ramp edge. The lower ramp may also have a first lower ramp end and an opposing second lower ramp end. The first lower ramp end may be pivotally connected to the second upper ramp end by a hinge. The second lower ramp end may be pivotally mountable to the transport vehicle bed. The vehicle transport ramp system may further include a first lower ramp enclosure panel and a second lower ramp enclosure panel that may be mountable to the first lower ramp side. The first lower ramp enclosure panel and the second lower ramp enclosure panel may be operative to partially enclose the transport vehicle as the lower ramp is lowered toward the driving surface. The vehicle ramp system may also include a first side wall enclosure panel that is proximate to the first lower ramp enclosure panel and a second side wall enclosure panel that is proximate to the second lower ramp enclosure panel. The first side wall enclosure panel and the second side wall enclosure panel may be operative to enclose the transport vehicle as the lower ramp is lowered toward the driving surface.

The vehicle transport ramp system is innovative in that the configuration of the lower ramp being pivotally connected to the upper ramp, as well as the upper ramp and the lower ramp being pivotally mountable to the transport vehicle and the transport vehicle bed, respectively, enable the combined length of the upper ramp and the lower ramp to be significantly increased. This feature may reduce vehicle "hang up" between a transported vehicle and the vehicle loading ramp, which occurs when the undercarriage of the transported vehicle comes into contact with and potentially even "scrapes" the loading ramp. Vehicle "hang up" may result in a loss of traction and the interruption of the vehicle loading process. A vehicle "hang up" may be caused by the pitch of a vehicle loading ramp being so steep as to cause a transported vehicle to abut the surface of the loading ramp with its undercarriage. This may impair the safety of the vehicle loading process, delay its completion, and also cause property damage to the transported vehicle. The increased combined length of the upper ramp and the lower ramp in this vehicle transport ramp system also enables its use on transport vehicles with a higher ground clearance from the distance between the transport vehicle bed and the driving surface. In addition, the increased range of motion of the upper ramp and the lower ramp, in being pivotally mountable to the transport vehicle and the transport vehicle bed, respectively, may enable the use of the vehicle transport ramp system on transport vehicles with a higher ground clearance. Transport vehicles with an increased ground clearance may include those having a 4×4 wheel suspension and drive system. Therefore, the vehicle transport ramp system may uniquely enable transport vehicles equipped to be driven on "off-road" driving surfaces, as well as paved "highway" driving surfaces to safely and efficiently load and unload transported vehicles. Accordingly, the vehicle transport system may reduce the time spent loading and unloading a vehicle into the transport vehicle, improve the traction of the vehicle loading and unloading process, and reduce the potential damage to the undercarriage of the transported vehicle. The vehicle transport ramp system may also expand the potential driving surfaces on which vehicle transport and the vehicle loading and unloading process may be completed. The innovative benefits of the vehicle transport ramp system may find application in a wide variety of transport vehicles, including but not limited to tow trucks, high-profile trailers, recreational vehicles, and any other ground-based vehicles used to transport a transported vehicle.

None of the prior art vehicle loading ramps appear to utilize an upper ramp operative to forming a door at the rear of the transport vehicle combined with a lower ramp to lengthen the ramp used to load and/or unload a transported vehicle with a transport vehicle having an increased ground clearance. Nor do any of the prior art vehicle loading ramp systems appear to use a first lower ramp enclosure panel, a second lower ramp enclosure panel, a first side wall enclosure panel, and a second side wall enclosure panel to enclose the open space created in the transport vehicle as the lower ramp is lowered from an elevated "off-road" driving mode to a "highway" driving mode. While pivotally connected, the prior art vehicle transport ramp systems appear to be limited for use with wheel suspensions and drive systems intended for single mode usage on paved highways and roads, where the transport vehicle does not have an increased ground clearance. The prior art vehicle loading ramp systems also appear to be primarily intended for use on pickup trucks or specialty vehicles.

According to another embodiment, the vehicle transport ramp system may further include a first upper ramp locking rail mountable to the transport vehicle. The first upper ramp locking rail may define a substantially perpendicular axis to the driving surface. The upper ramp may be mountable to the first upper ramp locking rail.

In one embodiment, the first upper ramp locking rail may be mountable to the first upper ramp edge. In yet a further embodiment, the first upper ramp locking rail may have a plurality of spaced holes sized and configured to receive a first upper ramp peg disposed on the first upper ramp edge. In another embodiment, the vehicle ramp transport system may further include a second upper ramp locking rail opposing the first upper ramp locking rail. The second upper ramp edge may be mountable to the second upper ramp locking rail. The second upper ramp locking rail may have a plurality of spaced holes sized and configured to receive a second upper ramp peg disposed on the second upper ramp edge. The insertion of the upper ramp pegs into the spaced holes located along the first upper ramp locking rail and the second upper ramp locking rail proximate to the first upper ramp end may enable the operation of the vehicle transport vehicle ramp system in an elevated "off-road" driving mode. The first upper ramp peg may be operative to lock the first upper ramp edge to the first upper ramp locking rail. The second upper ramp peg may be operative to lock the second upper ramp edge to the second upper ramp locking rail. These features of the vehicle transport ramp system may uniquely facilitate an efficient and secure mounting of the upper ramp to the transport vehicle.

Accordingly, the process of opening and closing the upper ramp may be expedited, thereby reducing the amount of time spent loading and unloading the transported vehicle.

In yet another embodiment, the vehicle transport ramp system may further include a first upper ramp assembly. The first upper ramp assembly may be operative to pivotally move the upper ramp. The first upper ramp assembly may have an upper ramp cable and an upper ramp pulley. The upper ramp cable may have an upper ramp cable first end and an opposing upper ramp cable second end. The upper ramp cable first end may be mounted to the upper ramp edge. The upper ramp cable second end may be connected to the upper ramp pulley. The upper ramp pulley may be mounted to the transport vehicle. This feature of the vehicle transport ramp system may uniquely enable the efficient opening and closing of the upper ramp. Accordingly, the use of the vehicle transport ramp system may not require many individuals to assist in the process of loading and unloading transported vehicles.

In another embodiment, the vehicle transport ramp system may further include a second upper ramp assembly. The second upper ramp assembly may have a second upper ramp cable and a corresponding second upper ramp pulley. The second upper ramp cable may be mounted to the upper ramp at a second upper ramp cable first end. The second upper ramp cable may be connectable to the second upper ramp pulley at a second upper ramp cable second end. The second upper ramp pulley may be mounted to the transport vehicle. The use of a second upper ramp assembly may further improve the efficiency of the opening and closing of the upper ramp in the vehicle transport ramp system.

As discussed above, in one embodiment the lower ramp may be pivotally connected to the upper ramp by a hinge. This configuration may uniquely enable the length of the upper ramp and the lower ramp to be significantly increased, thereby preventing vehicle "hang ups" on the combined upper ramp and lower ramp while also allowing for an increase of the potential ground clearance on transport vehicles using 4×4 wheel suspensions and drive systems intended for "off-road" driving. Because the upper ramp may be unfolded at the hinge from the lower ramp, the vehicle transport ramp system may be made operational quickly and efficiently for the loading and unloading of transported vehicles.

In yet a further embodiment of the present invention, the vehicle transport ramp system may further include a first lower ramp peg disposable on the first lower ramp edge proximate to the second lower ramp end. This embodiment may further include a first lower ramp module proximate to the transport vehicle bed along the first side wall. The first lower ramp peg may be pivotally mountable into the first lower ramp module. The second lower ramp peg may be pivotally mountable into the second lower ramp module. This embodiment may also include an opposing second lower ramp peg disposable on the second lower ramp edge proximate to the second lower ramp end. The lower ramp may be pivotally rotatable about the first lower ramp module and the second lower ramp module. This feature of the vehicle transport ramp system may uniquely provide a wide range of motion for the lower ramp, thereby enabling the efficient and quick lengthening of the combined upper ramp and lower ramp.

In a further embodiment, the vehicle transport ramp system may also include a pivot arm operative to pivotally rotate the lower ramp. The pivot arm may have a pivot arm first end and a pivot arm second end. The pivot arm first end may be mountable to the first lower ramp side proximate to the second lower ramp end. The pivot arm second end may have a pivot peg sized and configured to be pivotally disposable into a pivot peg guide proximate to the transport vehicle bed. The pivot arm may further enable the efficient rotational movement of the lower ramp between the elevated "off-road" driving mode, the "highway" driving mode, and when the upper ramp and lower ramp are extended to the driving surface in a "loading and unloading" mode.

According to another embodiment, the vehicle transport ramp system may further include a second pivot arm opposing the first pivot arm. The second pivot arm may have a second pivot arm first end and a second pivot arm second end. The second pivot arm first end may be mountable to the first lower ramp side proximate to the second lower ramp end. The second pivot arm second end may have a second pivot peg sized and configured to be pivotally disposable into a second pivot peg guide proximate to the transport vehicle bed.

In another embodiment, the vehicle transport ramp system may further include a first lower ramp enclosure panel proximate to the first side wall. The vehicle transport ramp system may also include an opposing second lower ramp enclosure panel proximate to the second side wall. The first lower ramp enclosure panel may have a first lower ramp enclosure panel guide that is slidably engageable by a corresponding first lower ramp enclosure panel peg. The first lower ramp enclosure panel peg may be operative to secure the first lower ramp enclosure panel to the first side wall. The second lower ramp enclosure panel may have a second lower ramp enclosure panel guide that is slidably engageable by a corresponding second lower ramp enclosure panel peg. The second lower ramp enclosure panel peg may be operative to secure the second lower ramp enclosure panel to the second side wall.

This feature of the vehicle transport ramp system may uniquely enable the partial enclosure of the transport vehicle when the lower ramp is lowered toward the driving surface from the elevated "off-road" driving mode to the "highway" driving mode, so as to protect the contents of the transport vehicle on the transport vehicle bed. The first lower ramp enclosure panel peg and the second lower ramp enclosure panel peg may be slidably engaged to the first lower ramp enclosure panel guide and the second lower ramp enclosure panel guide quickly and efficiently, between the elevated "off-road" driving mode, the "highway" driving mode, and the "loading and unloading" mode.

According to another embodiment, the first lower ramp enclosure panel may have a plurality of first lower ramp enclosure panel guides with a corresponding plurality of first lower ramp enclosure panel pegs. The first lower ramp enclosure panel pegs may secure the first lower ramp enclosure panel to the first side wall. The second lower ramp enclosure panel may have a plurality of second lower ramp enclosure panel guides with a corresponding plurality of second lower ramp enclosure panel pegs. The second lower ramp enclosure panel pegs may secure the second lower ramp enclosure panel to the second side wall.

According to another embodiment of the present invention, the first side wall enclosure panel may have a first side wall enclosure panel guide that is slidably engageable by a corresponding first side wall enclosure panel peg. The first side wall enclosure panel peg may be operative to secure the first side wall enclosure panel to the first side wall. The second side wall enclosure panel may have a second side wall enclosure panel guide that is slidably engageable by a corresponding second side wall enclosure panel peg. The second side wall enclosure panel peg may be operative to secure second side wall enclosure panel to the second side wall.

The side wall enclosure panel peg may be slidably engaged with the side wall enclosure panel guide so as to quickly and efficiently adjust the transport vehicle between the elevated "off-road" driving mode, the "highway" driving mode, and the "loading and unloading" mode.

In another embodiment, the vehicle transport ramp system may further include a first lower ramp assembly operative to pivotally move the lower ramp. The first lower ramp assembly may have a lower ramp cable and a lower ramp pulley. The lower ramp cable may have a lower ramp cable first end and an opposing lower ramp cable second end. The lower ramp cable first end may be mountable to the first lower ramp enclosure panel. The lower ramp cable second end may be connectable to the lower ramp pulley. The lower ramp pulley may be mountable to the transport vehicle. In one embodiment, the lower ramp pulley may be spring-loaded. As with the first upper ramp assembly, the first lower ramp assembly may uniquely enable the efficient and quick raising and lowering of the lower ramp between the elevated "off-road" driving mode, the "highway" driving mode, and the "loading and unloading" mode.

In yet a further embodiment, the vehicle transport ramp system may also include a second lower ramp assembly. The second lower ramp assembly may have a second lower ramp cable and a corresponding second lower ramp pulley. The second lower ramp cable may be mountable to the second lower ramp enclosure panel at a second lower ramp cable first end. The second lower ramp cable may be connectable to the second lower ramp pulley at a second lower ramp cable second end. The second lower ramp pulley may be mountable to the transport vehicle.

In another embodiment, the first lower ramp assembly may also include a lower ramp hydraulic actuator connected to the lower ramp cable second end. The lower ramp hydraulic actuator may be mountable to the transport vehicle.

In another embodiment, the first lower ramp assembly may include a lift arm mountable to the second lower ramp side. The lift arm may be connectable to a lift arm motor proximate to the transport vehicle bed.

Both the lower ramp hydraulic actuator and the lift arm may reduce the effort involved in raising and lowering the lower ramp during the operation of the vehicle transport ramp system.

In another embodiment, the first lower ramp assembly may also include a second lift arm mountable to the second lower ramp side. The second lift arm may be connectable to a second lift arm motor proximate to the transport vehicle bed.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The drawings referred to herein are for the purposes of illustrating the preferred embodiments of the present invention and not for the purposes of limiting the same.

Figure 1A:
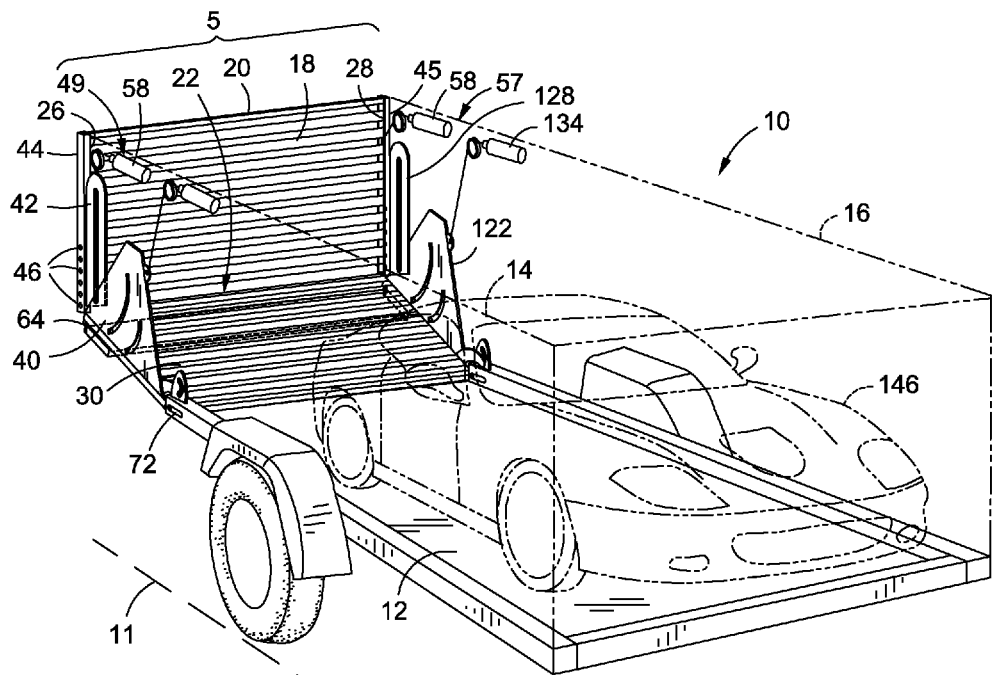
FIG. 1A is a perspective view of an embodiment of a vehicle transport ramp system with the upper ramp being pivotally connected to the upper ramp locking rails and to the lower ramp while in the elevated "off-road" driving mode, along with hydraulic actuators operative to move the upper ramp and the lower ramp.

FIG. 1A is an embodiment of a vehicle transport ramp system 5 used with a transport vehicle 10 having a transport vehicle bed 12, a first side wall 14, and an opposing second side wall 16 about a periphery of the transport vehicle bed 12. A transported vehicle 146 may be positioned on the transport vehicle bed 12 between the first side wall 14 and the second side wall 16. The upper ramp 18 may have a first upper ramp end 20 and a second upper ramp end 22. The upper ramp 18 may further have a first upper ramp edge 26 and an opposing second upper ramp edge 28. The upper ramp 18 may be sized and configured to be mountable to the transport vehicle 10. The upper ramp 18 may be operative to form a door enclosing the rear of the transport vehicle 10. The upper ramp 18 may be planar in nature. In this embodiment, the first upper ramp edge 26 may be mountable to a first upper ramp locking rail 44. The first upper ramp locking rail 44 may be mounted to the transport vehicle 10 and may be defined by a substantially perpendicular axis to the driving surface 11. In this embodiment, the first upper ramp locking rail 44 is shown to be mounted proximate to the second upper ramp end 22. The second upper ramp edge 28 may be mounted to a second upper ramp locking rail 45, with the second upper ramp locking rail 45 being mounted to the transport vehicle 10. In this embodiment, the second upper ramp locking rail 45 is shown to be mounted proximate to the second upper ramp end 22. The second upper ramp locking rail 45 may define a substantially perpendicular axis to the driving surface 11. The second upper ramp end 22 may be pivotally connected to a lower ramp 30 by a hinge 64. This configuration of the vehicle transport ramp system 5 may significantly increase the combined length of the upper ramp 18 and the lower ramp 30. Discussed further below, this novel feature may improve the efficiency and safety of loading and unloading the transported vehicle 146 into the transport vehicle 10. The increased combined length of the upper ramp 18 and lower ramp 30 may allow for transport vehicles 10 to have a transport vehicle bed 12 with an increased ground clearance from the driving surface 11. The combined length of the upper ramp 18 and the lower ramp 30 may allow for the use of the vehicle transport ramp system 5 on transport vehicles 10 having 4×4 wheel suspensions and drive systems. Accordingly, the vehicle transport ramp system 5 may be versatily used in an elevated "off-road" driving mode when the transport vehicle 10 is driven on uneven and unpaved driving surfaces, or in a "highway" driving mode when the transport vehicle 10 is driven on even paved driving surfaces 11.

As used herein, the term "transport vehicle" 10 refers to any ground-based transport vehicle 10 having a transport vehicle bed 12, a first side wall 14, and an opposing second side wall 16 about a periphery of the transport vehicle bed 12. The area between the first side wall 14, second wall 16, and the transport vehicle bed 12 may be any size, depending on the dimensions of the transport vehicle 10. Examples of transport vehicles 10 include but are not limited to tow trucks, trailers, recreational vehicles, buses, and vans.

Figure 2:
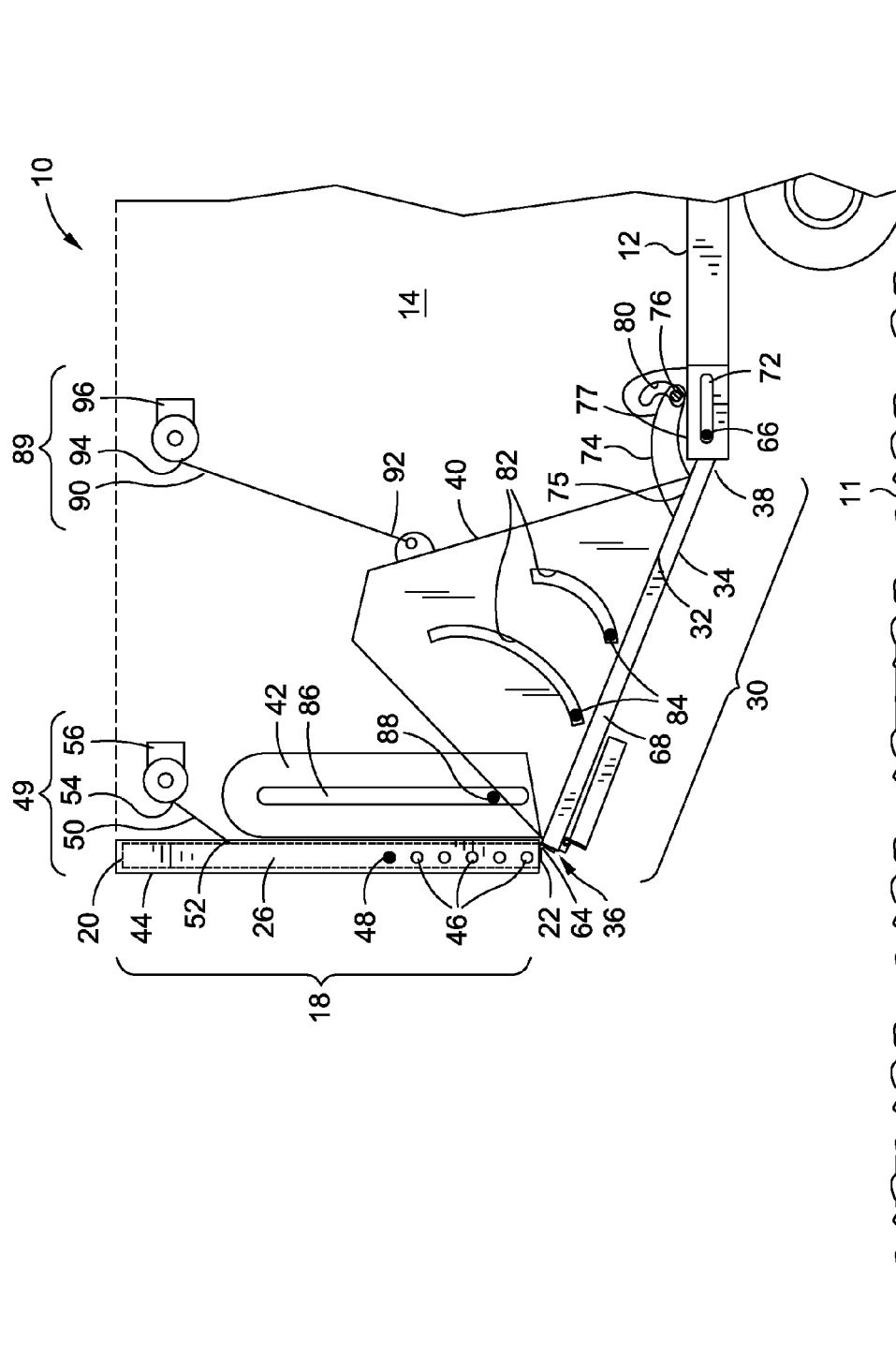
FIG. 2 is a side view of an embodiment of the vehicle transport ramp system depicting the position of the first upper ramp peg, the first side wall enclosure panel peg, and the first lower ramp enclosure panel pegs while the upper ramp and the lower ramp are in the elevated "off-road" driving mode.

As used herein, the term "elevated 'off-road' driving mode" refers to an upper ramp 18 having an angle formed with the lower ramp 30 that may be greater than 90 degrees and less than 180 degrees when the upper ramp 18 is substantially perpendicular to the driving surface 11. In one embodiment of the invention, as depicted in FIG. 2, the angle between the upper ramp 18 and the lower ramp 30 is approximately 135 degrees.

Figure 3:
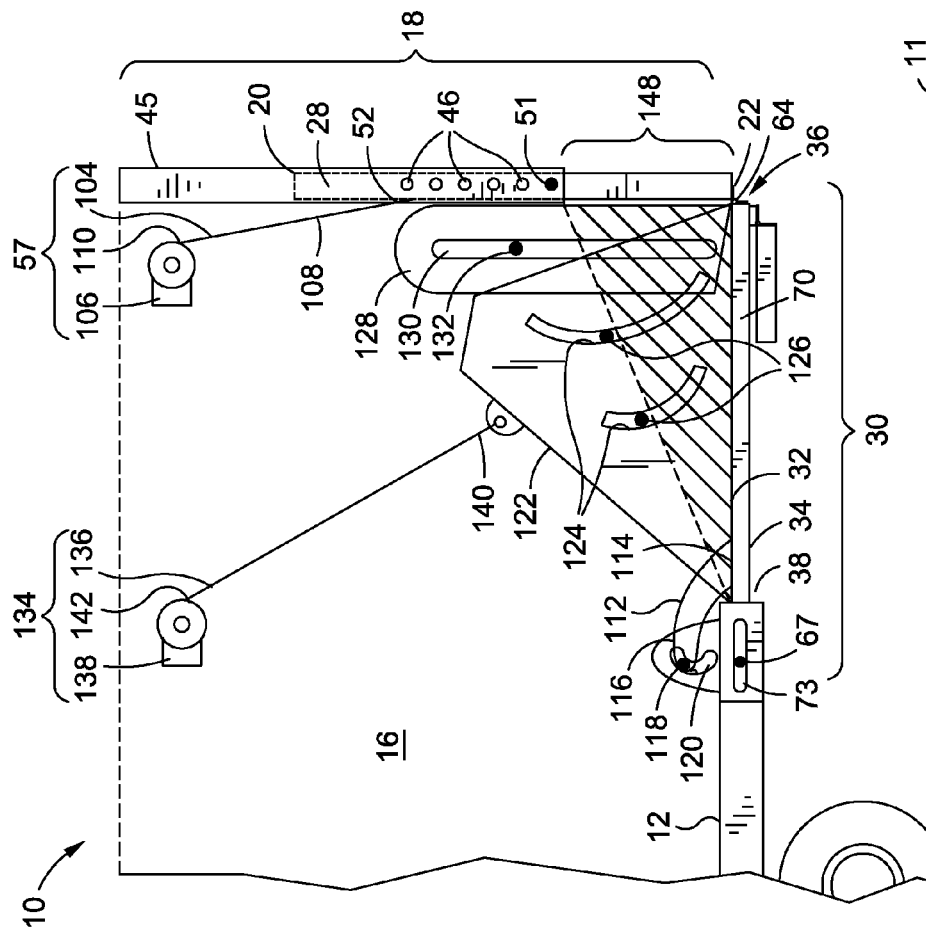
FIG. 3 is an opposing side view of an embodiment of the vehicle transport vehicle ramp system depicting the position of the second upper ramp peg, the second side wall enclosure panel peg, and the second lower ramp enclosure panel pegs while the upper ramp and the lower ramp are in the "highway" driving mode.

The term "highway' driving mode" as used herein refers to the upper ramp 18 having an angle formed with the lower ramp 30 that may be approximately 90 degrees when the upper ramp 18 is substantially perpendicular to the driving surface 11. In one embodiment of the invention, as depicted in FIG. 3, the upper ramp 18 is substantially perpendicular to both the lower ramp 30 and the driving surface 11.

As used herein, the term "loading and unloading" mode refers to the upper ramp 18 having an angle formed with the lower ramp 30 that may be approximately 180 degrees when the upper ramp 18 and the lower ramp 30 are extended along the driving surface 11 to allow for the loading and unloading of a transported vehicle 146 into the transport vehicle 10. In one embodiment of the vehicle transport ramp system 5, depicted in FIGS. 4 and 5, the "loading and unloading" mode shows the transported vehicle 146 on the upper ramp 18 with a support post 144 perpendicularly disposed beneath the lower ramp 30 on the driving surface 11.

As used herein, the term "lower ramp enclosure paneling" refers to a first lower ramp enclosure panel 40 and an opposing second lower ramp enclosure 122 mountable to the first lower ramp side 32 used to partially enclose the transport vehicle ramp system 5 when the transport vehicle 10 is operated in the "highway" driving mode. While the first lower ramp enclosure panel 40 and the second lower ramp enclosure panel 122 may be any shape, it is anticipated that in one embodiment the first lower ramp enclosure panel 40 and the second lower ramp enclosure panel 122 shall be generally triangular to partially enclose an "open space" 148 created by the lowering of the lower ramp 30 into the "highway" driving mode.

As used herein, the term "side wall enclosure paneling" refers to a first side wall enclosure panel 42 proximate to the first lower ramp enclosure panel 40 and an opposing second side wall enclosure panel 128 proximate to the second lower ramp enclosure panel 122. The first side wall enclosure panel 42 and the second side wall enclosure panel 128 are used to enclose the transport vehicle ramp system 5 when the transport vehicle 10 is operated in the "highway" driving mode. While the first side wall enclosure panel 42 and the opposing second side wall enclosure panel 128 may be any shape, it is anticipated that the first side wall enclosure panel 42 and the opposing second side wall enclosure panel 128 may be generally rectangular to enclose the "open space" 148 proximate to the first lower ramp enclosure panel 40 and the second lower ramp enclosure panel 122 remaining after the lower ramp 30 has been lowered into the "highway" driving mode.

As used herein, the term "transport vehicle bed" 12 refers to an area in the transport vehicle 10 surrounded by the first side wall 14 and opposing second side wall 16 having sufficient strength to support the transported vehicle 146 and of sufficient size to position the transported vehicle 146 in the transport vehicle 10. While the transport vehicle bed 12 may be any shape, because transport vehicles 10 are generally rectangular in shape (that is they are longer than they are wide), it is anticipated that the transport vehicle bed 12 may also be generally rectangular. In one embodiment of the vehicle transport ramp system 5, depicted in FIGS. 1A and 1B, the transport vehicle bed 12 is rectangular. It is contemplated that the transport vehicle bed 12 may also be square, circular or oval in shape, again depending on the configuration of the transport vehicle 10. The transport vehicle bed 12 need not have a uniform thickness, texture, or density. The transport vehicle bed 12 may be any size, again depending on the dimensions of the transport vehicle 10 and the transported vehicle 146.

An embodiment of the vehicle transport ramp system 5 may include a first lower ramp enclosure panel 40 proximate to the first side wall 14 and an opposing second lower ramp enclosure panel 122 proximate to the second side wall 16. The first lower ramp enclosure panel 40 and the second lower ramp enclosure panel 122 may be operative to partially enclose the open space 148 of the transport vehicle 10 when the lower ramp 30 has been lowered toward the driving surface 11 from the elevated "off-road" driving mode to the "highway" driving mode. In this embodiment, the vehicle transport ramp system 5 may include the first side wall enclosure panel 42 proximate to the first lower ramp enclosure panel 40 and opposing second side wall enclosure panel 128 proximate to the second lower ramp enclosure panel 122 operative to slideably enclose the open space 148 created when the lower ramp 30 has been lowered toward the driving surface 11 in the "highway" driving mode. The upper ramp 18 may be operative to form a door enclosing the rear of the transport vehicle 10 while the transport vehicle 10 is in either the elevated "off-road" driving mode or in the "highway" driving mode. These features uniquely enable the vehicle transport ramp system 5 to protect the contents of the transport vehicle 10, and in particular the transported vehicle 146, from unwanted access or removal.

Referring now to FIGS. 2 and 3, the upper ramp 18 may be mounted by a first upper ramp assembly 49 and a second upper ramp assembly 57 operative to pivotally open or close the upper ramp 18. In one embodiment of the vehicle transport ramp system 5, the first upper ramp assembly 49 may include an upper ramp cable 50 having an upper ramp cable first end 52 and an opposing upper ramp cable second end 54. The upper ramp cable first end 52 may be mounted to the upper ramp 18. The upper ramp cable second end 54 may be connected to an upper ramp pulley 56. The upper ramp pulley 56 may be spring loaded. The upper ramp pulley 56 may be mounted to the transport vehicle 10. Likewise, the second upper ramp assembly 57 may include a second upper ramp cable 104 having a second upper ramp cable first end 108 mounted to the upper ramp 18. The second upper ramp cable 104 may also include a second upper ramp cable 110 connected to a second upper ramp pulley 106 mounted to the transport vehicle 10. In one embodiment, the first upper ramp assembly 49 and second upper ramp assembly 57 may further include an upper ramp hydraulic actuator 58 mounted to the first side wall 14 and the second side wall 16, respectively. The first upper ramp assembly 49 and the second upper ramp assembly 57 may uniquely enable the efficient opening and closing of the upper ramp 18. Accordingly, there may not be a need for many individuals to assist in the process of loading and unloading the transported vehicle 146 into the transport vehicle 10, as the upper ramp 18 may be lifted by the first upper ramp assembly 49 and the second upper ramp assembly 57. In the embodiment depicted in FIGS. 1A, 4 and 5, the operator of the vehicle transport ramp system 5 may electronically activate either from the inside or the outside of the transport vehicle 10 an upper ramp hydraulic actuator 58 to move the vehicle transport ramp system 5 into its various positions, namely the elevated "off-road" driving mode, the "highway" driving mode, and the "loading and unloading" mode.

Figure 1B:
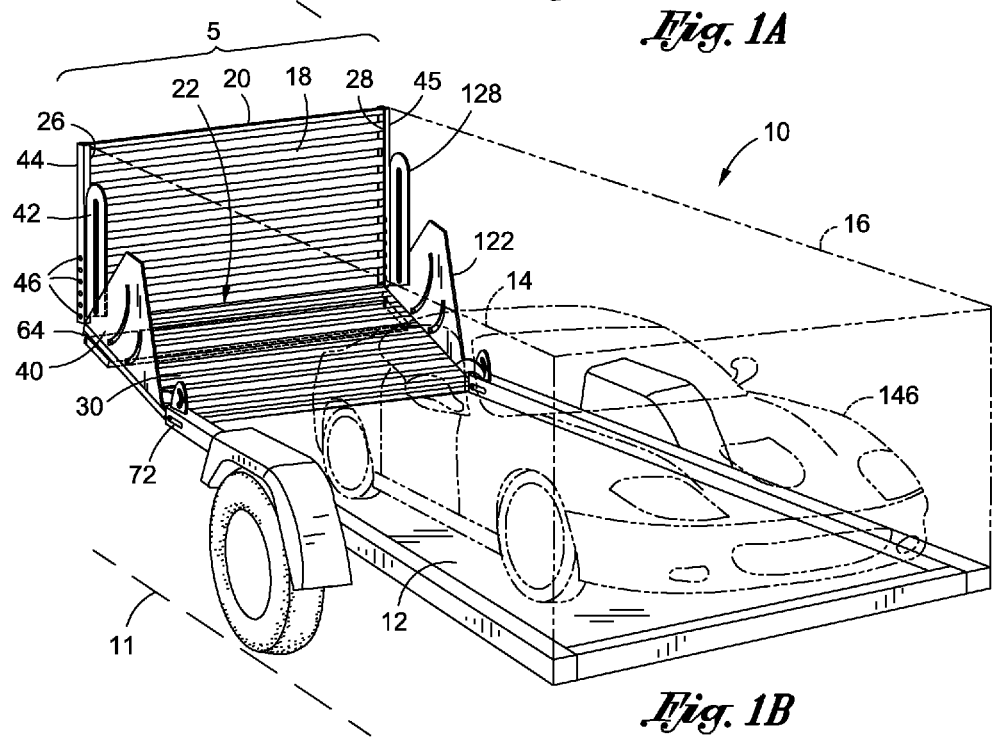
FIG. 1B is a perspective view of an embodiment of the vehicle transport ramp with the upper ramp being pivotally connected to the upper ramp locking rails and to the lower ramp while in the elevated "off-road" driving mode.

FIG. 1B is an embodiment of the vehicle transport ramp system 5 that does not include a first upper ramp assembly 49 and a second upper ramp assembly 57.

Again referring to FIGS. 2 and 3, an embodiment of the vehicle transport ramp system may further include a lower ramp 30 having a first lower ramp side 32 and an opposing second lower ramp side 34. In this embodiment, the lower ramp 30 may also have a first lower ramp edge 68 and an opposing second lower ramp edge 70. The lower ramp 30 may further have a first lower ramp end 36 and an opposing second lower ramp end 38. The first lower ramp end 36 may be pivotally connected to the second upper ramp end 22. In this embodiment, the second lower ramp end 38 may be pivotally mounted to a first lower ramp module 72 proximate to the transport vehicle bed 12 along the first side wall 14. The lower ramp 30 may also include a first lower ramp peg 66 on the first lower ramp edge 68 proximate to the second lower ramp end 38. The second lower ramp edge 70 may include an opposing second lower ramp peg 67 proximate to the second lower ramp end 38. The first lower ramp peg 66 may be pivotally mounted to the first lower ramp module 72. The second lower ramp peg 67 may be pivotally mounted to a second lower ramp module 73. Accordingly, in this embodiment, the lower ramp 30 may be pivotally rotatable about the first lower ramp module 72 and the second lower ramp module 73. This feature of the lower ramp 30 may enable the use of the vehicle transport ramp system 5 on transport vehicles 10 that have a higher ground clearance. The increased range of motion of the lower ramp 30 along with the increased combined length of the upper ramp 18 and the lower ramp 30 may enable the use of the vehicle transport ramp system 5 on transport vehicles 10 with 4×4 wheel suspension and drive systems intended for use on "off-road" driving surfaces 11. The combined length of the upper ramp 18 and the lower ramp 30 may also reduce the occurrence of vehicle "hang up", when the undercarriage of the transported vehicle 146 abuts the upper ramp 18 or lower ramp 30 as it is being loaded and/or unloaded into the transport vehicle 10. The increased combined length of the upper ramp 18 and the lower ramp 30 may reduce the pitch of the combined upper ramp 18 and lower ramp 30, thereby decreasing the occurrence of vehicle "hang up" during the loading and unloading process. Accordingly, these features of the vehicle transport ramp system 5 may improve the efficiency and safety of the loading and unloading of the transported vehicle 146, as well as potentially reduced property damage to the undercarriage of the transported vehicle 146 due to vehicle "hang up". In FIG. 2, the lower ramp 30 is depicted in the elevated "off-road" driving mode, when the transport vehicle 10 is being driven on uneven and/or unpaved driving surfaces 11 requiring 4×4 wheel suspensions and drive systems. In FIG. 3, the lower ramp 30 is depicted in the "highway" driving mode when the transport vehicle 10 is being driven on an even and/or paved driving surface 11.

Still referring to FIGS. 2 and 3, in this embodiment of the vehicle transport ramp system 5, the first upper ramp edge 26 is mounted to the first upper ramp locking rail 44. The second upper ramp edge 28 is mounted to the second upper ramp locking rail 45 opposite the first upper ramp locking rail 44. The first upper ramp locking rail 44 has a plurality of spaced holes 46 sized and configured to receive the first upper ramp peg 48. The first upper ramp edge 26 includes the first upper ramp peg 48. The insertion of the first upper ramp peg 48 into one of the plurality of spaced holes 46 disposed on the first upper ramp locking rail 44 is operative to lock the first upper ramp edge 26 to the first upper ramp locking rail 44. In one embodiment shown in FIG. 3, the second upper ramp edge 28 may be mounted to the second upper ramp locking rail 45. The second upper ramp locking rail 45 may have a plurality of spaced holes 46 sized and configured to receive a second upper ramp peg 51. The insertion of the second upper ramp peg 51 into one of the plurality of spaced holes 46 disposed on the second upper ramp locking rail 45 is operative to lock the second upper ramp edge 28 to the second upper ramp locking rail 45. These unique features of the vehicle transport ramp system 5 may uniquely enable the efficient and secure mounting of the upper ramp 18 to the transport vehicle 10. Accordingly, the vehicle transport ramp system 5 may not require many individuals to assist in the process of securing the upper ramp 18 to the first upper ramp locking rail 44 and the second upper ramp locking rail 45.

FIGS. 2 and 3 also depict an embodiment of the vehicle transport ramp system 5 with the first lower ramp enclosure panel 40 positioned proximate to the first side wall 14. As shown in FIG. 3, an opposing second lower ramp enclosure panel 122 is proximate to the second side wall 16. The first lower ramp enclosure panel 40 may have a first lower ramp enclosure panel guide 82 in which a first lower ramp enclosure panel peg 84 may be slidably engaged to secure the first lower ramp enclosure panel 40 to the first side wall 14. The second lower ramp enclosure panel 122 has a second lower ramp enclosure panel guide 124 that may be slidably engaged by a second lower ramp enclosure panel peg 126 to secure the second lower ramp enclosure panel 122 to the second side wall 16. In another embodiment, the first lower ramp enclosure panel 40 may have a plurality of first lower ramp enclosure panel guides 82, slideably engaged by a corresponding plurality of first lower ramp enclosure panel pegs 84 operative to secure the first lower ramp enclosure panel 40 to the first side wall 14. Likewise, the second lower ramp enclosure panel 122 may have a plurality of second lower ramp enclosure guides 124 slideably engaged by a corresponding plurality of second lower ramp enclosure panel pegs 126 operative to secure the second lower ramp enclosure panel 122 to the second side wall 16. This feature uniquely enables the partial enclosure of the transport vehicle 10 when the lower ramp 30 is lowered toward the driving surface 11 from the elevated "off-road" driving mode to the "highway" driving mode. The partial enclosure of the transport vehicle 10 may protect the contents of the transport vehicle, including the transported vehicle 146, from unintended access or removal from the transport vehicle bed 12. The process of slideably engaging the first lower ramp enclosure panel peg 84 and the second lower ramp enclosure panel peg 126 to the first lower ramp enclosure panel guide 82 and the second lower ramp enclosure panel guide 124 may be completed quickly and efficiently, when the vehicle transport ramp system 5 is being adjusted from the elevated "off-road" driving mode to the "highway" driving mode, and subsequently to the "loading and unloading" mode.

Another embodiment of the vehicle transport ramp system 5 depicted in FIGS. 2 and 3 may further include the first side wall enclosure panel 42 proximate to the first lower ramp enclosure panel 40. An opposing second side wall enclosure panel 128 may be proximate to the second lower ramp enclosure panel 122. The first side wall enclosure panel 42 may have a first side wall enclosure panel guide 86 that may be slidably engaged by a corresponding first side wall enclosure panel peg 88 to secure the first side wall enclosure panel 42 to the first side wall 14. In this embodiment, the second side wall enclosure panel 128 may have a second side wall enclosure panel guide 130 that may be slidably engaged by a corresponding second side wall enclosure panel peg 132 operative to secure the second side wall enclosure panel 128 to the second side wall 16.

A further embodiment of the vehicle transport ramp system 5 may include a pivot arm 74 mounted to the first lower ramp side 32 proximate to the second lower ramp end 38. The pivot arm 74 may have a pivot arm first end 75 and a pivot arm second end 77. The pivot arm first end 75 may be mounted to the first lower ramp side 32. The pivot arm second end 77 may have a pivot peg 76 sized and configured to be pivotally disposed into a pivot peg guide 80 proximate to the transport vehicle bed 12. In another embodiment, the lower ramp 30 may have a second pivot arm 112 mounted to the first lower ramp side 32 proximate to the second lower ramp end 38. The second pivot arm 112 may have a second pivot arm first end 114 and a second pivot arm second end 116. The second pivot arm first end 114 may be mounted to the first lower ramp side 32 of the lower ramp 30. The second pivot arm second end 116 may have a second pivot peg 118 sized and configured to be pivotally disposed into a second pivot peg guide 120 proximate to the transport vehicle bed 12.

Referring again to FIG. 2, when the vehicle transport ramp system 5 is in the elevated "off-road" driving mode, the first upper ramp peg 48 may be disposed in the spaced hole 46 on the first upper ramp locking rail 44 proximate to the first upper ramp end 20. In this embodiment, the first side wall enclosure panel peg 88 may be slidably engaged with the first side wall enclosure panel 42 proximate to the bottom of the first side wall enclosure panel guide 86. The first lower ramp enclosure panel pegs 84 may be slidably engaged with the first lower ramp enclosure panel 40 proximate to the bottom of the first lower ramp enclosure panel guides 82. In this embodiment, the first lower ramp peg 66 may be pivotally mounted to the first lower ramp module 72 distal to the transport vehicle bed 12. The pivot peg 76 of the pivot arm 74 may be pivotally disposed proximate to the bottom of the pivot peg guide 82.

Referring now to an embodiment depicted in FIG. 3, when the vehicle transport ramp system 5 is in the "highway" driving mode, the second upper ramp peg 51 on the second upper ramp locking rail 45 may be inserted in the spaced hole 46 proximate to the second upper ramp end 22. In this embodiment, the second side wall enclosure panel peg 132 may be disposed proximate to the middle of the second side wall enclosure panel guide 130 of the second side wall enclosure panel 128. Similarly, the second lower ramp enclosure panel pegs 126 may be disposed proximate to the middle of the second lower ramp enclosure panel guides 124 of the second lower ramp enclosure panel 122. In this embodiment, the second lower ramp peg 67 may be pivotally mounted in the second lower ramp module 73 proximate to the transport vehicle bed 12. The second pivot peg 118 of the second pivot arm 112 may be pivotally disposed proximate to the top of the second pivot peg guide 120.

Figure 4:
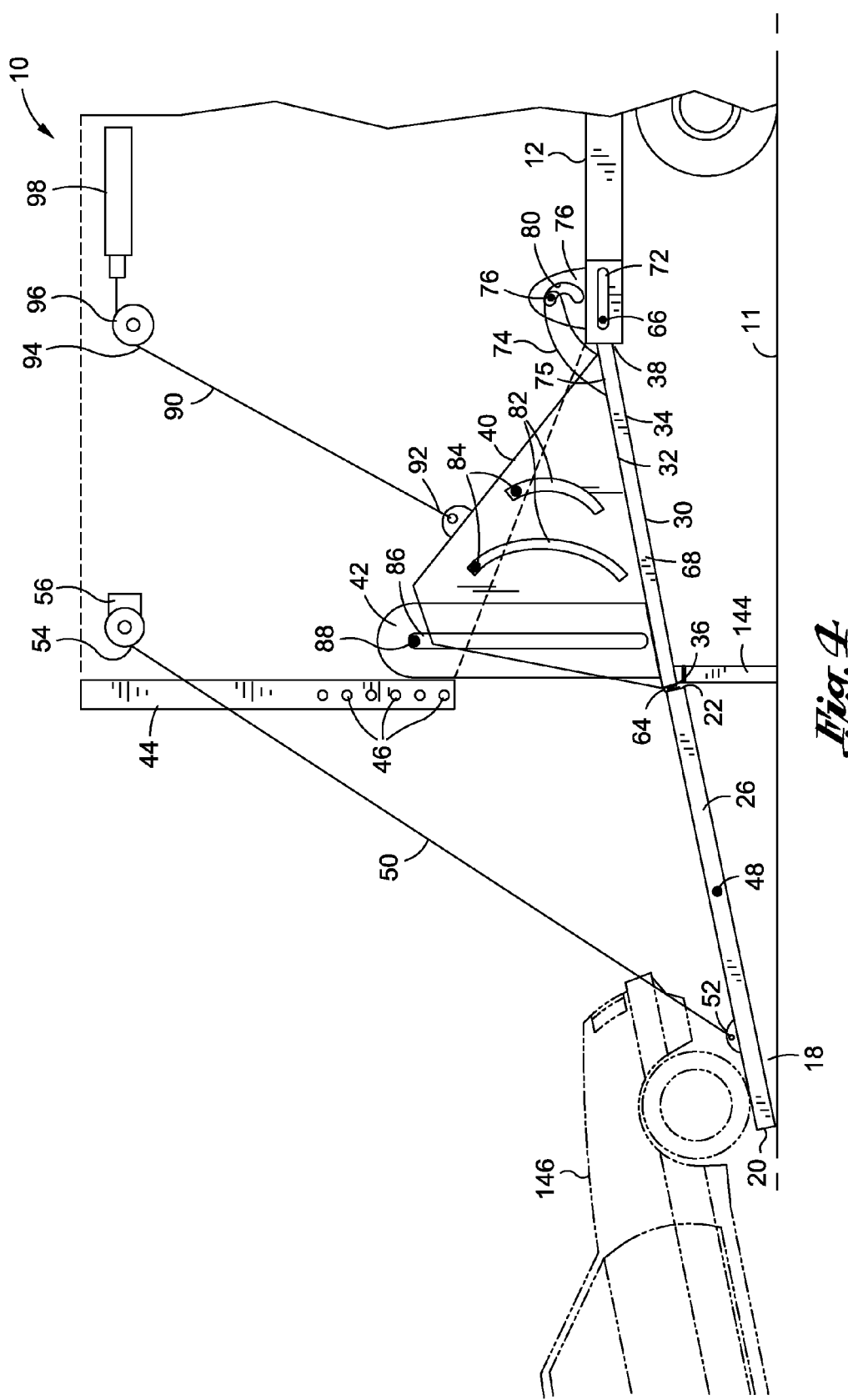
FIG. 4 is a side view of the upper ramp being lowered to the driving surface by the upper ramp cable, and the lower ramp being lowered to the driving surface by the lower ramp cable, with a support post positioned to support the loading of a vehicle into the transport vehicle.

Referring now to FIG. 4, the upper ramp 18 may be lowered to the driving surface 11 when the vehicle transport ramp system 5 is in the "loading and unloading" mode. The upper ramp cable 50 may be connected to the upper ramp 18 at an upper ramp cable first end 52. The upper ramp cable 50 may also be connected to an upper ramp pulley 56 at the upper ramp cable second end 54. The first lower ramp enclosure panel 40 may be lowered toward the driving surface 11 by a lower ramp cable 90. The lower ramp cable 90 may be connected to the first lower ramp enclosure panel 40 at a lower ramp cable first end 92. The lower ramp cable 90 may be connected to a lower ramp pulley 96 at a lower ramp cable second end 94. A lower ramp hydraulic actuator 98 may be mounted to the transport vehicle 10 and connected to the lower ramp cable second end 94 in order to assist in lowering the first lower ramp enclosure panel 40 toward the driving surface 11. In the "loading and unloading" mode, a support post 144 is perpendicularly disposed beneath the upper ramp 18 or the lower ramp 30 to the driving surface 11 operative to support the upper ramp 18 or the lower ramp 30. In this embodiment, when the vehicle transport ramp system 5 is in the "loading and unloading" mode, the first upper ramp peg 48 may be disconnected from the spaced holes 46 along the upper ramp locking rail 44. The first side wall enclosure panel peg 88 may be disposed proximate to the top of the first side wall enclosure panel guide 86. Similarly, the first lower ramp enclosure panel pegs 84 may be disposed proximate to the top of the first lower ramp enclosure panel guides 82. The pivot peg 76 may be pivotally disposed proximate to the top of the pivot peg guide 80.

In this embodiment, the vehicle transport ramp system 5 may assist in reducing what may occur due to vehicle "hang up" when the undercarriage of the transported vehicle 146 abuts the upper ramp 18 and/or the lower ramp 30. As discussed above, the increased length of the combined upper ramp 18 and the lower ramp 30 may reduce the angle at which the transported vehicle is loaded and unloaded into the transport vehicle 10. As such, the vehicle transport ramp system 5 may reduce the likelihood that the transported vehicle 146 will scrape the surface of the upper ramp 18 or lower ramp 30 as it is being loaded into the transport vehicle 10. This feature along with the upper ramp 18 and the lower ramp 30 being pivotally mountable to the transport vehicle uniquely allows the use of the vehicle transport ramp system 5 on transport vehicles 10 utilizing 4×4 wheel suspension and drive systems that have increased ground clearance the driving surface 11.

Referring now to FIG. 3, the vehicle transport ramp system 5, may include a second lower ramp assembly 134. The second lower ramp assembly 134 may have a second lower ramp cable 136 and a corresponding second lower ramp pulley 138. The second lower ramp cable 136 may be mounted to the second lower ramp enclosure panel 122 at a second lower ramp cable first end 140. The second lower ramp cable 136 may be connected to the second lower ramp pulley 138 at a second lower ramp cable second end 142. As with the first lower ramp assembly 89, the second lower ramp assembly 134 may be mounted to the transport vehicle 10 and operative to pivotally move the lower ramp 30 in an efficient manner when alternating between the elevated "off-road" driving mode, the "highway" driving mode, and the "loading and unloading" mode.

Figure 5:
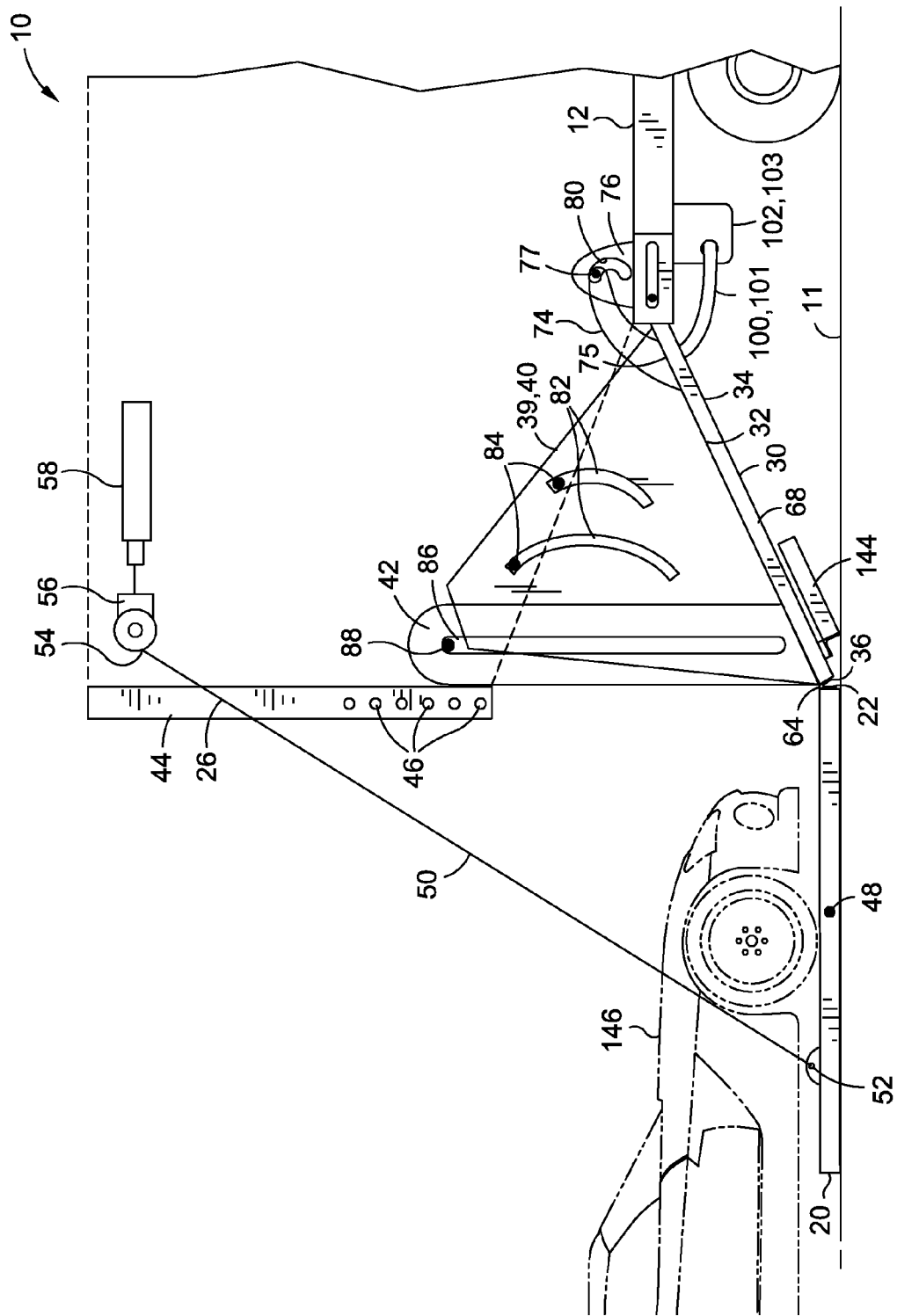
FIG. 5 is a side view of the transported vehicle on the upper ramp, with the upper ramp being lifted by a hydraulic actuator from the driving surface to a position next to the lower ramp for loading of the transported vehicle, with a lift arm mounted to the second lower ramp side and a lift arm motor operative to move the lower ramp.

Referring now to FIG. 5, a further embodiment of the vehicle transport ramp system 5 may include a first upper ramp assembly 49 including an upper ramp hydraulic actuator 58 mounted to the upper ramp pulley 56. In this embodiment, the upper ramp 18 may be initially disposed directly on and parallel to the driving surface 11. The support post 144 may be folded towards the lower ramp 30. This embodiment of the vehicle transport system 5 may be most useful for the loading of a transported vehicle 146 that is a sports car or other high-speed vehicle having an aerodynamic profile with a lower ground clearance from the driving surface 11 that may be particularly susceptible to some form of vehicle "hang up" during the loading process. While the front end of the transported vehicle 144 is disposed on the upper ramp 18, the upper ramp 18 and the lower ramp 30 may be moved to be flush with and proximate to each other, forming an angle of approximately 180 degrees. The upper ramp 18 and the lower ramp 30 may then be further raised or lowered in tandem by the first upper ramp assembly 49 and the first lower ramp assembly 89, as needed. The transported vehicle 144 may then be further loaded onto the lower ramp 30. Still referring to FIG. 5, in one embodiment, the first lower ramp assembly 89 may include a lift arm 100 mounted to the second lower ramp side 34. The lift arm 100 may be connected to a lift arm motor 102 proximate to the transport vehicle bed 12. In another embodiment, the vehicle transport ramp system 5 may further include a second lift arm 101 mounted to the second lower ramp side 34. The second lift arm 101 may be connected to a second lift arm motor 103 proximate to the transport vehicle bed 12. The lift arm 100 and second lift arm 101 are operative to pivotally move the lower ramp 30 up and down.

Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A vehicle transport ramp system for use with a transport vehicle to be driven on a driving surface, the transport vehicle having a transport vehicle bed, a first side wall and an opposing second side wall about a periphery of the transport vehicle bed, the transport ramp system comprising:
    an upper ramp having a first upper ramp end and an opposing second upper ramp end generally defining an upper ramp plane, a first upper ramp edge and an opposing second upper ramp edge, the upper ramp being sized and configured to be pivotally mountable to the transport vehicle and operative to form a door;
    a lower ramp having a first lower ramp side and an opposing second lower ramp side, a first lower ramp edge and an opposing second lower ramp edge, and a first lower ramp end and an opposing second lower ramp end, the first lower ramp end being pivotally connected to the second upper ramp end by a hinge and the second lower ramp end being pivotally mountable to the transport vehicle bed;
    a first lower ramp enclosure panel and a second lower ramp enclosure panel mountable to the first lower ramp side, the first lower ramp enclosure panel and the second lower ramp enclosure panel being operative to partially enclose the transport vehicle as the lower ramp is lowered toward the driving surface; and
    a first side wall enclosure panel proximate to the first lower ramp enclosure panel and a second side wall enclosure panel proximate to the second lower ramp enclosure panel operative to slidably enclose the transport vehicle as the lower ramp is lowered toward the driving surface.

2. The system as claimed in claim 1 further includes a first upper ramp locking rail mountable to the transport vehicle, the first upper ramp locking rail defines a substantially perpendicular axis to the driving surface, the upper ramp is mountable to the first upper ramp locking rail.

3. The system as claimed in claim 2, wherein the first upper ramp edge is mountable to the first upper ramp locking rail.

4. The system as claimed in claim 3, wherein the system includes a second upper ramp locking rail opposing the first upper ramp locking rail, the second upper ramp edge is mountable to the second upper ramp locking rail.

5. The system as claimed in claim 4, wherein the first upper ramp locking rail has a plurality of spaced holes sized and configured to receive a first upper ramp peg, the first upper ramp peg is disposable on the first upper ramp edge operative to lock the first upper ramp edge to the first upper ramp locking rail, the second upper ramp locking rail has a plurality of spaced holes sized and configured to receive a second upper ramp peg, the second upper ramp peg being disposable on the second upper ramp edge operative to lock the second upper ramp edge to the second upper ramp locking rail.

6. The system as claimed in claim 1 further includes a first upper ramp assembly operative to pivotally move the upper ramp, the first upper ramp assembly has an upper ramp cable and an upper ramp pulley, the upper ramp cable has an upper ramp cable first end and an opposing upper ramp cable second end, the upper ramp cable first end is mountable to the upper ramp, the upper ramp cable second end is connectable to the upper ramp pulley, the upper ramp pulley is mountable to the transport vehicle.

7. The system as claimed in claim 6 further includes a second upper ramp assembly, the second upper ramp assembly has a second upper ramp cable and a corresponding second upper ramp pulley, the second upper ramp cable is mountable to the upper ramp at a second upper ramp cable first end, the second upper ramp cable is connectible to the second upper ramp pulley at a second upper ramp cable second end, the second upper ramp pulley is mountable to the transport vehicle.

8. The system as claimed in claim 1, wherein the lower ramp includes a first lower ramp peg disposable on the first lower ramp edge proximate to the second lower ramp end, an opposing second lower ramp peg disposable on the second lower ramp edge proximate to the second lower ramp end, a first lower ramp module proximate to the transport vehicle bed along the first side wall, and an opposing second lower ramp module proximate to the transport vehicle bed along the second side wall, the first lower ramp peg is pivotally mountable to the first lower ramp module, the second lower ramp peg is pivotally mountable to the second lower ramp module, the lower ramp is pivotably rotatable about the first lower ramp module and the second lower ramp module.

9. The system as claimed in claim 1 further includes a pivot arm operative to pivotably rotate the lower ramp, the pivot arm has a pivot arm first end and a pivot arm second end, the pivot arm first end is mountable to the first lower ramp side proximate to the second lower ramp end, the pivot arm second end has a pivot peg sized and configured to be pivotally disposable into a pivot peg guide proximate to the transport vehicle bed.

10. The system as claimed in claim 9 further includes a second pivot arm opposing the first pivot arm, the second pivot arm has a second pivot arm first end and a second pivot arm second end, the second pivot arm first end is mountable to the first lower ramp side proximate to the second lower ramp end, the second pivot arm second end has a second pivot peg sized and configured to be pivotably disposable into a second pivot peg guide proximate to the transport vehicle bed.

11. The system as claimed in claim 1, wherein the first lower ramp enclosure panel has a first lower ramp enclosure panel guide that is slidably engageable by a corresponding first lower ramp enclosure panel peg, the first lower ramp enclosure panel peg being operative to secure the first lower ramp enclosure panel to the first side wall, the second lower ramp enclosure panel has a second lower ramp enclosure panel guide that is slidably engageable by a corresponding second lower ramp enclosure panel peg, the second lower ramp enclosure panel peg being operative to secure the second lower ramp enclosure panel to the second side wall.

12. The system as claimed in claim 11, wherein the first lower ramp enclosure panel has a plurality of first lower ramp enclosure panel guides with a corresponding plurality of first lower ramp enclosure panel pegs to secure the first lower ramp enclosure panel to the first side wall, and the second lower ramp enclosure panel has a plurality of second lower ramp enclosure panel guides with a corresponding plurality of second lower ramp enclosure panel pegs to secure the second lower ramp enclosure panel to the second side wall.

13. The system as claimed in claim 1, wherein the first side wall enclosure panel has a first side wall enclosure panel guide that is slidably engageable by a corresponding first side wall enclosure panel peg, the first side wall enclosure panel peg being operative to secure the first side wall enclosure panel to the first side wall, the second side wall enclosure panel has a second side wall enclosure panel guide that is slidably engageable by a corresponding second side wall enclosure panel peg, the second side wall enclosure panel peg being operative to secure the second side wall enclosure panel to the second side wall.

14. The system as claimed in claim 1 further includes a first lower ramp assembly operative to pivotally move the lower ramp, the first lower ramp assembly has a lower ramp cable and a lower ramp pulley, the lower ramp cable has a lower ramp cable first end and an opposing lower ramp cable second end, the lower ramp cable first end is mountable to the first lower ramp enclosure panel, the lower ramp cable second end is connectable to the lower ramp pulley, the lower ramp pulley is mountable to the transport vehicle.

15. The system as claimed in claim 14 further includes a second lower ramp assembly, the second lower ramp assembly has a second lower ramp cable and a corresponding second lower ramp pulley, the second lower ramp cable is mountable to the second lower ramp enclosure panel at a second lower ramp cable first end, the second lower ramp cable is connectible to the second lower ramp pulley at a second lower ramp cable second end, the second lower ramp pulley is mountable to the transport vehicle.

16. The system as claimed in claim 14 further includes a lower ramp hydraulic actuator connected to the lower ramp cable second end, the lower ramp hydraulic actuator is mountable to the transport vehicle.

17. The system as claimed in claim 1 wherein the first lower ramp assembly includes a lift arm mountable to the second lower ramp side, the lift arm is connectable to a lift arm motor proximate to the transport vehicle bed.

18. The system as claimed in claim 17 further includes a second lift arm mountable to the second lower ramp side, the second lift arm is connectable to a second lift arm motor proximate to the transport vehicle bed.

* * * * *